United States Patent
Kitagawa et al.

(10) Patent No.: US 9,919,466 B2
(45) Date of Patent: Mar. 20, 2018

(54) MANUFACTURING APPARATUS OF RUBBER MEMBER AND MANUFACTURING METHOD OF RUBBER MEMBER

(71) Applicant: TOYO TIRE & RUBBER CO., LTD., Osaka-shi, Osaka (JP)

(72) Inventors: Masato Kitagawa, Osaka (JP); Katsuji Niwa, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 1391 days.

(21) Appl. No.: 13/682,422

(22) Filed: Nov. 20, 2012

(65) Prior Publication Data

US 2013/0134631 A1    May 30, 2013

(30) Foreign Application Priority Data

Nov. 24, 2011 (JP) .................................. 2011-256351

(51) Int. Cl.
*B29C 47/00* (2006.01)
*B29C 47/08* (2006.01)
(Continued)

(52) U.S. Cl.
CPC ...... *B29C 47/0021* (2013.01); *B29C 47/0828* (2013.01); *B29C 47/122* (2013.01);
(Continued)

(58) Field of Classification Search
CPC ................................................ B29C 47/0021
See application file for complete search history.

(56) References Cited

U.S. PATENT DOCUMENTS 3,647,346 A * 3/1972 Minnie ............... B29C 47/0816
264/176.1
5,156,781 A * 10/1992 Bohm .................... B29C 47/38
210/171
2004/0089400 A1    5/2004 Vargo et al.

FOREIGN PATENT DOCUMENTS

JP     58-191137 A    11/1983
JP       4-8527 A     1/1992
(Continued)

OTHER PUBLICATIONS

Office Action dated Jun. 23, 2015 issued in counterpart Application No. 2011-256351, with English translation. (11 pages).
(Continued)

*Primary Examiner* — Joseph S Del Sole
(74) *Attorney, Agent, or Firm* — Westerman, Hattori, Daniels & Adrian, LLP

(57) ABSTRACT

A manufacturing apparatus of a rubber member includes an extruder that kneads and feeds a rubber material; a mouthpiece that discharges the rubber material supplied from the extruder; a support member that has a support surface opposing the mouthpiece; a rubber collection chamber that is formed between the mouthpiece and the support surface, that collects the rubber material discharged from the mouthpiece, and that has an opening in a front movement direction of the support surface with respect to the mouthpiece; and a shutter that opens and closes the opening. A plate-like rubber member is molded using the rubber material discharged from the mouthpiece onto the support surface by relatively moving the support surface and the mouthpiece.

7 Claims, 12 Drawing Sheets

(51) Int. Cl.
*B29C 47/12* (2006.01)
*B29C 47/36* (2006.01)
*B29C 47/60* (2006.01)
*B29C 47/92* (2006.01)

(52) U.S. Cl.
CPC ........ *B29C 47/364* (2013.01); *B29C 47/6031* (2013.01); *B29C 47/92* (2013.01); *B29C 47/0019* (2013.01); *B29C 47/367* (2013.01)

(56) References Cited

FOREIGN PATENT DOCUMENTS

| | | |
|---|---|---|
| JP | 7-205333 A | 8/1995 |
| JP | 2002-187218 A | 7/2002 |
| JP | 2004-161000 A | 10/2004 |
| JP | 2010-228343 A | 10/2010 |
| JP | 2011-173369 A | 9/2011 |
| JP | 2011-183750 A | 9/2011 |

OTHER PUBLICATIONS

Chinese Office Action dated Oct. 16, 2015 issued in counterpart Chinese patent application No. 201210479244.3, with English translation. (23 pages).

Office Action dated Mar. 18, 2016, issued in counterpart Chinese Application No. 201210479244.3, with English translation (16 pages).

\* cited by examiner

MANUFACTURING APPARATUS OF RUBBER MEMBER AND MANUFACTURING METHOD OF RUBBER MEMBER

BACKGROUND OF THE INVENTION

Field of the Invention

The present invention relates to a manufacturing apparatus of a rubber member and a manufacturing method of the rubber member.

Background Art

In general, a pneumatic tire is manufactured such that individual tire configuring members such as an inner liner unit, a sidewall unit, a bead unit and a tread unit are formed in advance, these tire configuring members are bonded in an unvulcanized state to mold a green tire, and the green tire goes through a vulcanized molding.

JP-A-2004-161000 and JP-A-2002-187218 disclose that in the tire configuring member such as the sidewall unit or the bead unit, a rubber material kneaded using an extruder is extruded from a mouthpiece, a plate-like rubber member which has a predetermined cross-sectional shape is formed, and then the distal ends of the formed plate-like rubber member are bonded to mold the tire configuring member.

In a manufacturing apparatus of the rubber member disclosed in JP-A-2004-161000 and JP-A-2002-187218, the rubber material fed from the extruder is supplied onto a supporting surface, the supplied rubber material is pressed against the supporting surface using dies, the supporting surface is moved with respect to the dies, and thereby the rubber member which has a predetermined cross-sectional shape is molded between the dies and the supporting surface. However, the cross-sectional shape of the molded rubber member is constant. Accordingly, if the distal ends of the formed plate-like rubber member are bonded, the bonded portion becomes thicker compared to the other portion and thereby there is a problem in that a weight balance cannot be uniform.

SUMMARY OF THE INVENTION

The present invention is made in view of the above-mentioned problem, and an object thereof is to provide a manufacturing apparatus and a manufacturing method of a rubber member, which enables a uniform weight balance without a bonded portion becoming thicker compared to the other portion even when distal ends of the plate-like molded rubber member are stacked in the thickness direction and bonded to each other.

A manufacturing apparatus of a rubber member according to an embodiment includes an extruder that kneads and feeds a rubber material; a mouthpiece that discharges the rubber material supplied from the extruder; and a support member that has a support surface opposing the mouthpiece. In the manufacturing apparatus that molds a plate-like rubber member using the rubber material discharged from the mouthpiece onto the support surface by relatively moving the support surface and the mouthpiece, there are further provided a rubber collection chamber that is formed between the mouthpiece and the support surface, that collects the rubber material discharged from the mouthpiece, and that has an opening in a front movement direction of the support surface with respect to the mouthpiece; and a shutter that opens and closes the opening.

In addition, in a manufacturing method of a rubber member according to an embodiment, a plate-like rubber member is molded using a rubber material discharged from a mouthpiece onto a support surface by the support surface opposing the mouthpiece and the mouthpiece being relatively moved while the rubber material fed from an extruder is discharged from the mouthpiece. A rubber collection chamber that has an opening in the front movement direction of the support surface with respect to the mouthpiece is formed between the mouthpiece and the support surface. After the opening is closed by a shutter, and the rubber collection chamber is filled up with the rubber material discharged from the mouthpiece, the opening is open by moving the shutter while the support surface and the mouthpiece are relatively moved.

DETAILED DESCRIPTION OF THE INVENTION

First Embodiment

Figure 1:
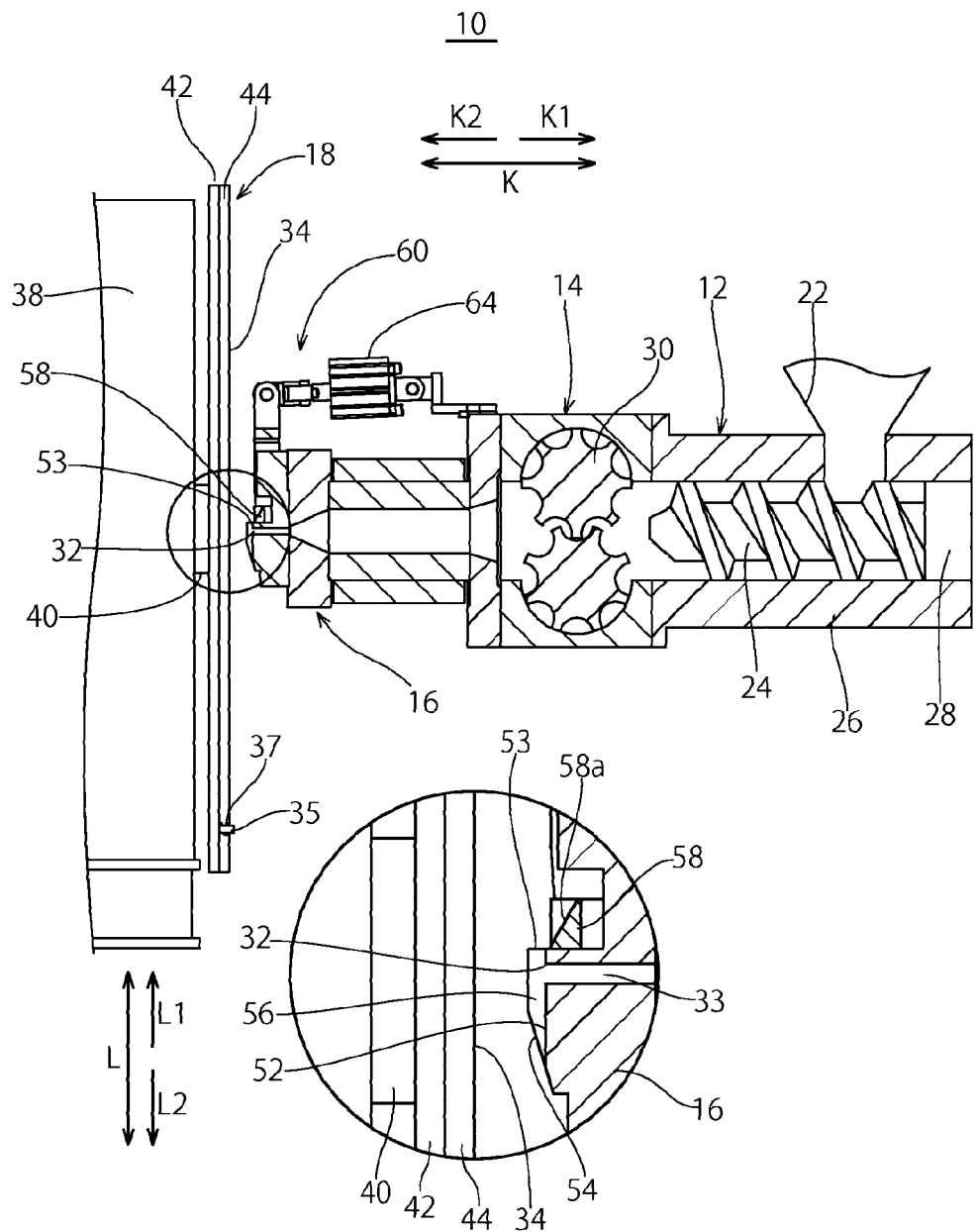
FIG. 1 is a schematic configuration diagram illustrating a manufacturing apparatus of a rubber member according to a first embodiment of the present invention.

As illustrated in FIG. 1, a manufacturing apparatus (hereinafter referred to as a manufacturing apparatus) 10 of a rubber member according to the present embodiment includes an extruder 12, a gear pump 14, a mouthpiece 16 and a support member 18. The manufacturing apparatus 10 extrudes a rubber material kneaded by the extruder 12, from the mouthpiece 16, and molds a rubber member M which has an annular thin plate shape illustrated in FIG. 11, on a support surface 34 of the support member 18.

Figure 11:
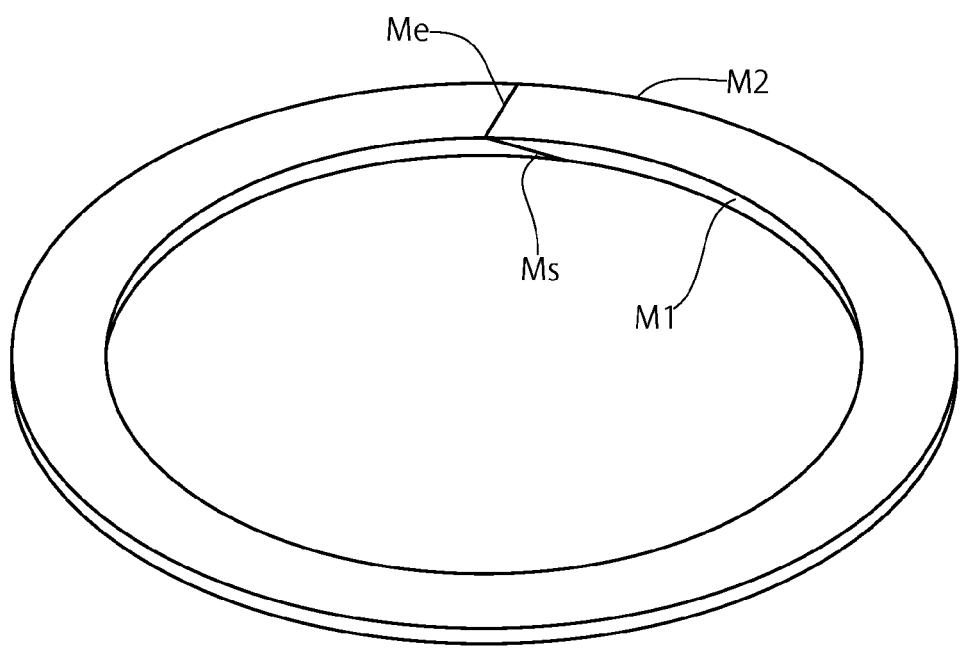
FIG. 11 illustrates an example of a rubber member manufactured by a manufacturing apparatus of the rubber member according to the present invention.

Furthermore, in the present embodiment, a case where the rubber member M, which has the annular thin plate shape illustrated in FIG. 11, is molded is described. However, the rubber member M manufactured by the manufacturing apparatus 10 is not limited thereto, and a leading end and a trailing end of a plate-like molded rubber member, such as a cylindrical rubber member, may be stacked in the thickness direction and bonded to each other.

The extruder 12 includes a hopper 22 into which the rubber material is introduced, a screw 24 that feeds the rubber material forward while applying heat, a cylindrical barrel 26 that has the screw 24 inside, and a driver 28 that drives the screw 24, and supplies the low viscosity rubber material to the gear pump 14.

The gear pump 14 is connected to the tip of the extruder 12 in the extruding direction, and has a pair of gears 30 inside. The gear pump 14 feeds the rubber material toward the mouthpiece 16, connected to the tip in the extruding direction of the rubber material, while controlling the feeding amount.

The mouthpiece 16 includes a discharge port 32 that discharges the rubber material, and a flow channel 33 that guides the rubber material supplied from the extruder 12 via the gear pump 14, to the discharge port 32. The mouthpiece 16 is arranged such that the tip thereof opposes the support surface 34 provided at the support member 18.

The extruder 12 to which the mouthpiece 16 and the gear pump 14 are attached is moved by a movement mechanism such that the mouthpiece 16 moves closer to and further apart from the support surface 34 of the support member 18. Further, in the embodiment, the extruder 12 is moved with respect to the support member 18, but the support member 18 may be moved with respect to the mouthpiece 16 such that the support surface 34 and the mouthpiece 16 relatively move closer to and further apart from each other.

The support member 18 includes a base 42 and a plate-like support device 44 that is attachable and detachable with respect to the base 42, and one plate surface of the support device 44 configures the support surface 34 opposing the mouthpiece 16. The base 42 is connected to a pivot 40 of a rotation driver 38. The rotation driver 38 drives the support member 18 to rotate around the pivot 40 and thereby the support surface 34 and the mouthpiece 16 relatively move. Furthermore, L1 in the drawing indicates a front movement direction of the support surface 34 with respect to the mouthpiece 16, and L2 indicates a rear movement direction of the support surface 34 with respect to the mouthpiece 16.

In this support member 18, a positioning bump 35 may be provided at the base 42, and when the support device 44 is attached to the base 42, a hole 37 to which the positioning bump 35 is fitted may be provided in the support device 44. Accordingly, it is possible to attach the support device 44 to a desired position of the base 42, and thereby it is possible to mold the rubber member M at a desired position on the support surface 34 of the support device 44.

In the manufacturing apparatus 10 having such a configuration, as illustrated in FIGS. 2 to 5, there is formed a recess 52 which is indented in a direction K1 apart from the support surface 34, at the tip of the mouthpiece 16 opposing the support surface 34. If the support surface 34 of the support member 18 is moved close to the mouthpiece 16, a rubber collection chamber 56 is formed by dividing between the recess 52 and the support surface 34.

The discharge port 32 provided at the mouthpiece 16 opens to the rubber collection chamber 56 provided at the position opposing the support surface 34, and the rubber material is discharged from the discharge port 32 toward the support surface 34. The manufacturing apparatus 10 of the embodiment, while causing the rubber material discharged from the discharge port 32 into the rubber collection chamber 56, to collide with the support surface 34 and by adhering the rubber material to the support surface 34, fills up the rubber collection chamber 56 with rubber material.

The rubber collection chamber 56 formed between the mouthpiece 16 and the support surface 34 includes an opening 53 which opens in the front movement direction L1 of the support surface 34 with respect to the mouthpiece 16, and an opening 54 which opens in the rear movement direction L2 of the support surface 34 with respect to the mouthpiece 16. The shape of the opening 53 provided in the front movement direction L1 has a shape corresponding to the cross-section shape of the rubber member M to be molded. The opening 53 provided in the front movement direction L1 is open and closed by a shutter 58.

The shutter 58 has a tapered surface 58a that is inclined in the direction apart from the support surface 34, as a surface opposing a surface which closes the opening 53 of the rubber collection chamber 56, goes in the front movement direction L1 of the support surface 34 with respect to the mouthpiece 16. In other words, the shutter 58 is configured such that the dimension along the movement direction L of the support surface 34 becomes smaller as it comes closer to the support surface 34 (as it goes toward the tip).

The shutter 58 is provided at the mouthpiece 16 so as to be movable in a normal direction (that is, a direction closer to and further apart from the support surface 34) K of the support surface 34 via a linear motion guide 59. Using a shutter driver 60, the shutter 58 moves between a closing position where the opening 53 of the rubber collection chamber 56 illustrated in FIGS. 2 and 3 is closed, and an opening position where the opening 53 of the rubber collection chamber 56 illustrated in FIGS. 4 and 5 is open.

The shutter driver 60 includes a frame member 62 and a cylinder mechanism 64 that moves the frame member 62 in the normal direction K of the support surface 34. The shutter 58 is attached to one end (in the present embodiment, the end in the rear movement direction L2 side of the support surface 34) 62a of the frame member 62. The cylinder mechanism 64 is attached to the other end (in the embodiment, the end in the front movement direction L1 of the support surface 34) 62b of the frame member 62. In addition, the frame member 62 is pivotally supported to the mouthpiece 16 via a shank 66 between the one end 62a and the other end 62b.

Figure 2:
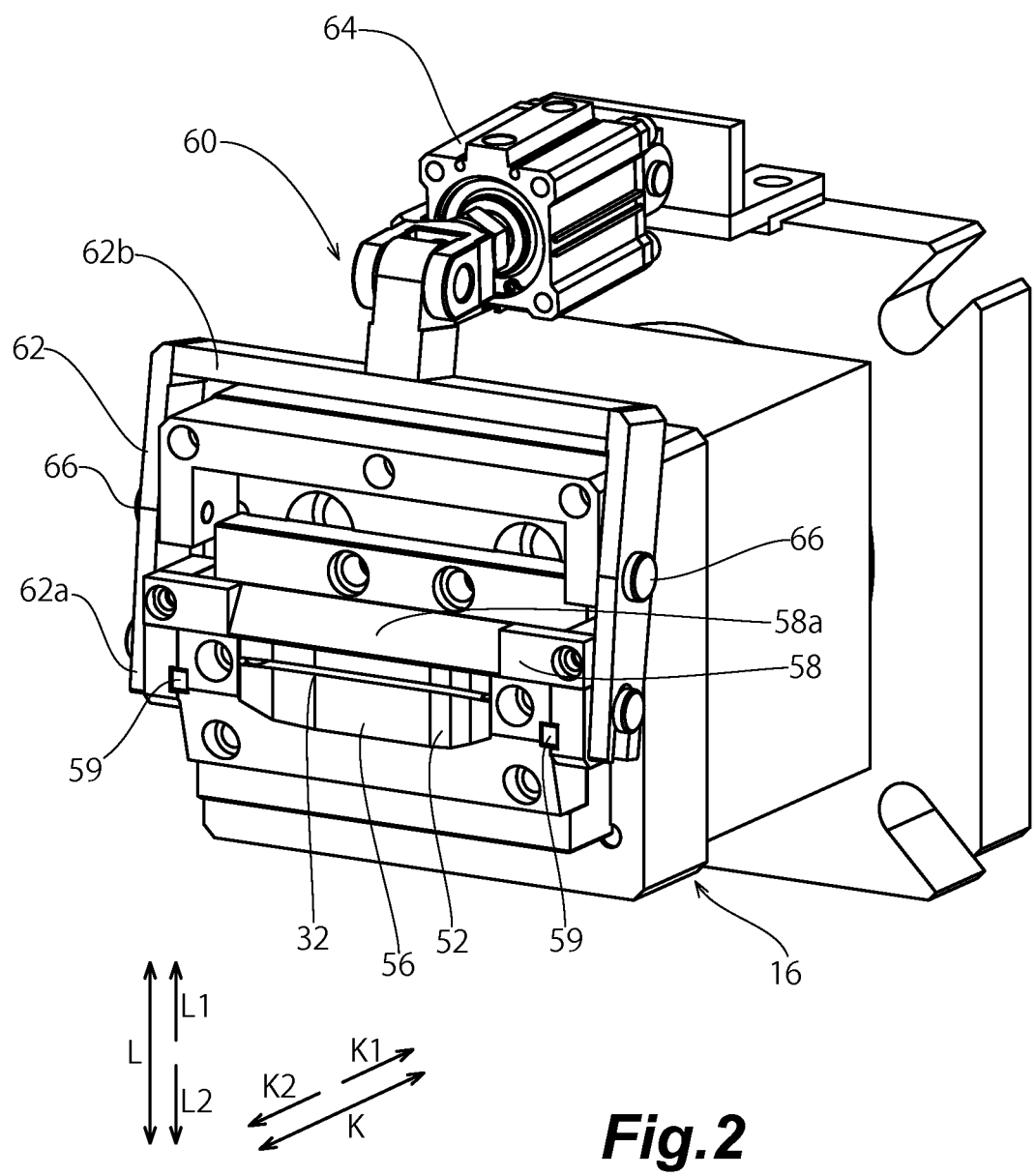
FIG. 2 is a perspective view of a mouthpiece in the manufacturing apparatus of a rubber member in FIG. 1, and illustrates a state where a shutter is in a closed position.
Figure 3:
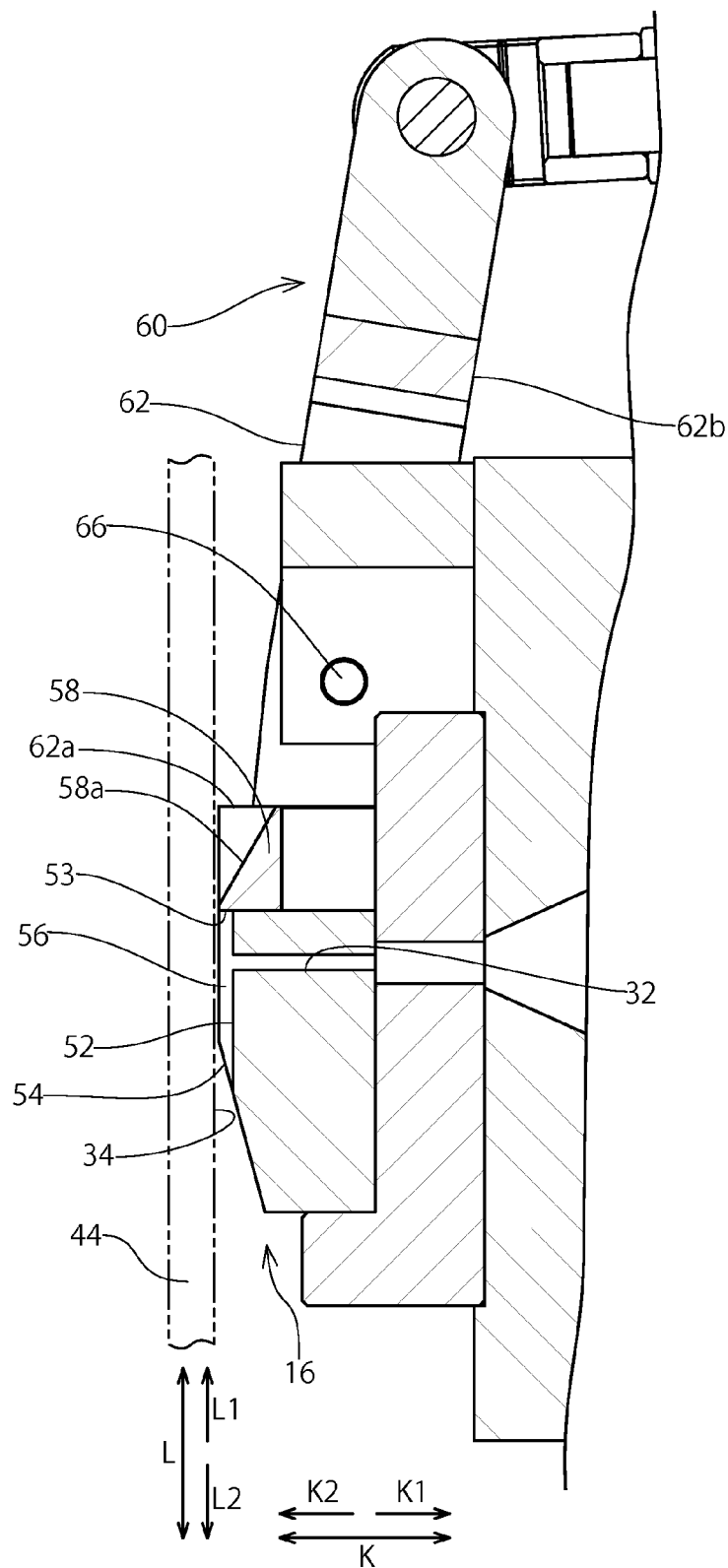
FIG. 3 is a cross-sectional view of the mouthpiece in FIG. 2.
Figure 4:
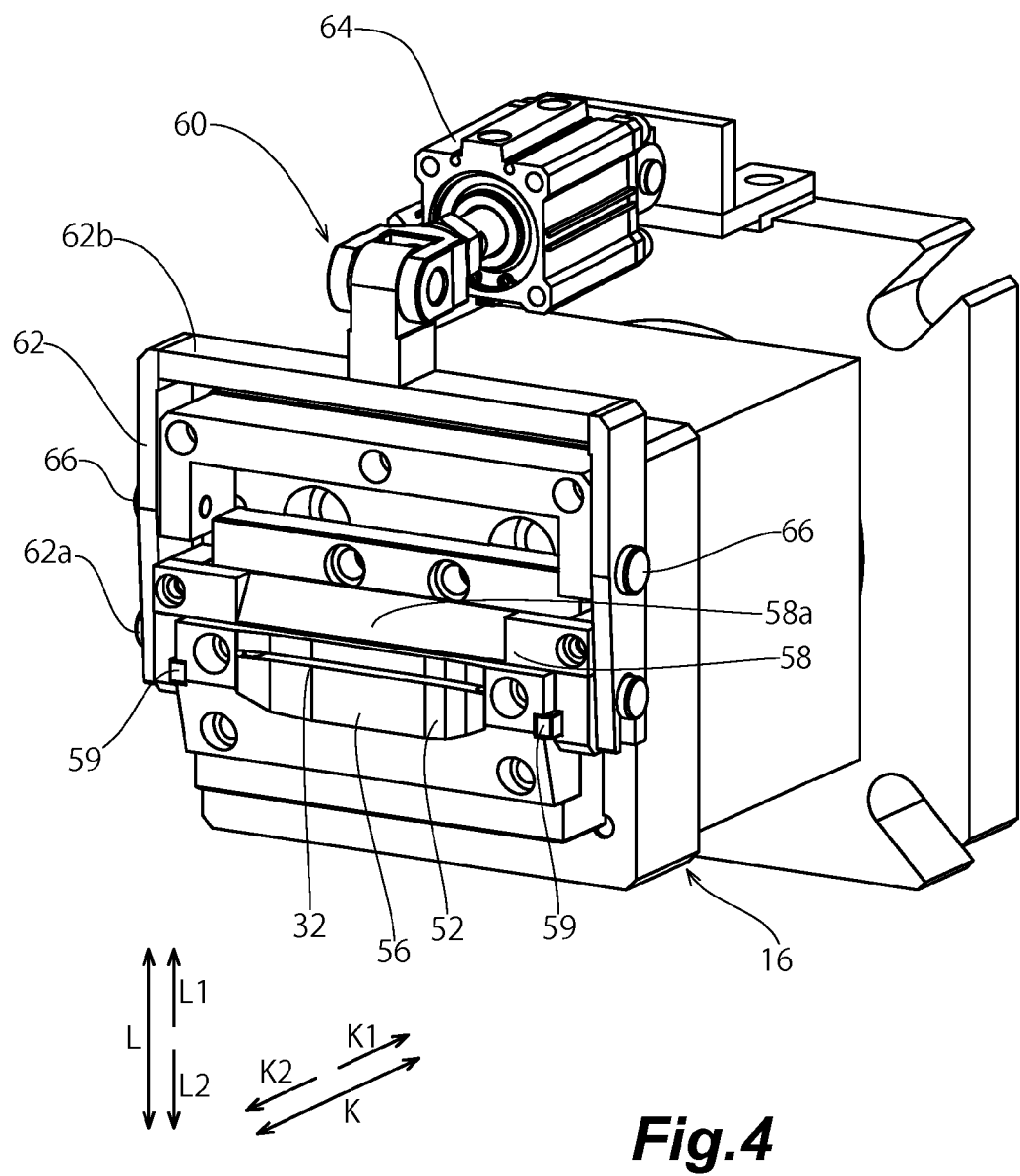
FIG. 4 is a perspective view of the mouthpiece in the manufacturing apparatus of a rubber member in FIG. 1, and illustrates a state where the shutter is in an open position.
Figure 5:
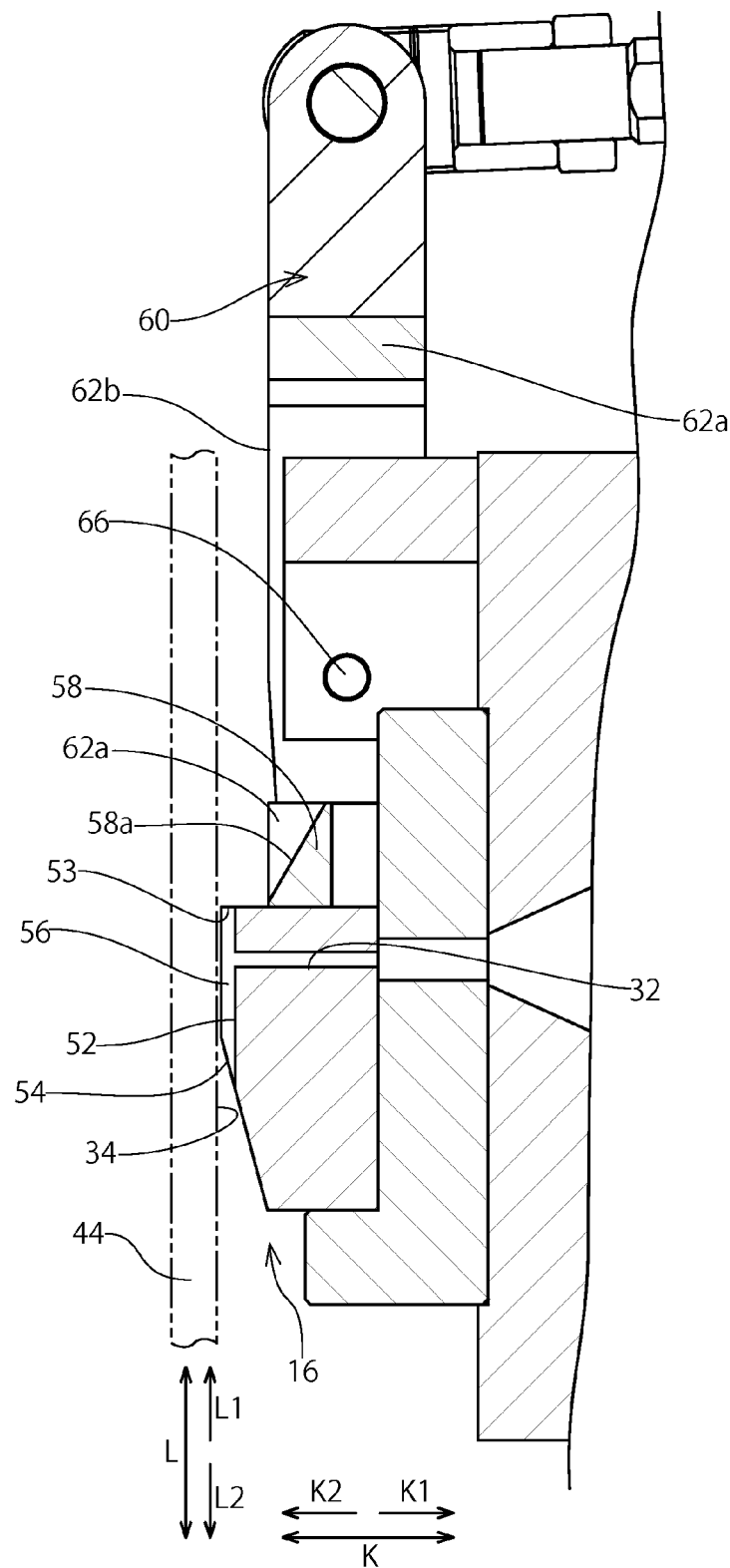
FIG. 5 is a cross-sectional view of the mouthpiece in FIG. 4.

In order for the shutter driver 60 having such a configuration to move the shutter 58 from the closing position illustrated in FIGS. 2 and 3 to the opening position illustrated in FIGS. 4 and 5, the cylinder mechanism 64 moves the other end 62b of the frame member 62 in a direction K2 close to the support surface 34. Accordingly, the frame member 62 revolves as a fulcrum of the shank 66 such that the one end 62a of the frame member 62 moves in the direction K1 apart from the support surface 34. As a result, the shutter 58 attached to the one end 62a of the frame member 62 moves from the closing position to the opening position while sliding along the linear motion guide 59.

In addition, in order to move the shutter 58 from the opening position to the closing position, the cylinder mechanism 64 moves the other end 62b of the frame member 62 in the direction K1 apart from the support surface 34. Accordingly, the frame member 62 revolves as a fulcrum of the shank 66 such that the one end 62a of the frame member 62 moves in the direction K2 close to the support surface 34. As a result, the shutter 58 attached to the one end 62a of the frame member 62 moves from the opening position to the closing position while sliding along the linear motion guide 59.

Next, a manufacturing method of a rubber member M which has an annular thin plate shape illustrated in FIG. 11 will be described using the manufacturing apparatus 10.

First, the movement mechanism is driven to move the extruder 12, and while leaving a clearance which enables the support device 44 to be rotated between the tip of the mouthpiece 16 connected to the extruder 12 via the gear pump 14 and the support surface 34 of the support member 18, the mouthpiece 16 is moved close to the support surface 34 of the support member 18. In addition, the shutter 58 is arranged at the closing position and the shutter 58 closes the opening 53 of the rubber collection chamber 56.

Next, the extruder 12 and the gear pump 14 are driven, a constant feeding amount of rubber material is discharged from the discharge port 32 into the rubber collection chamber 56 and is caused to collide with the support surface 34. While the rubber material is adhered to the support surface 34, the rubber collection chamber 56 is filled up with the rubber material.

After the rubber collection chamber 56 is filled up with the rubber material, while discharging the rubber material from the discharge port 32 to the rubber collection chamber 56, the rotation driver 38 is driven to rotate the support surface 34 of the support member 18 around the pivot 40. Then, the support surface 34 is rotated in a predetermined direction and at a predetermined rotation speed with respect to the mouthpiece 16.

Furthermore, at the moment of starting the rotation of the support surface 34, the shutter 58 is located at the closing position and closes the opening 53 of the rubber collection chamber 56. However, the rubber material inside the rubber collection chamber 56 is discharged from the slight clearance provided between the shutter 58 and the support surface 34. The rubber material discharged from the clearance is rubbed against the support surface 34 by the shutter 58 and thereby the thin rubber member M in close contact with the support surface 34 is molded.

Figure 6:
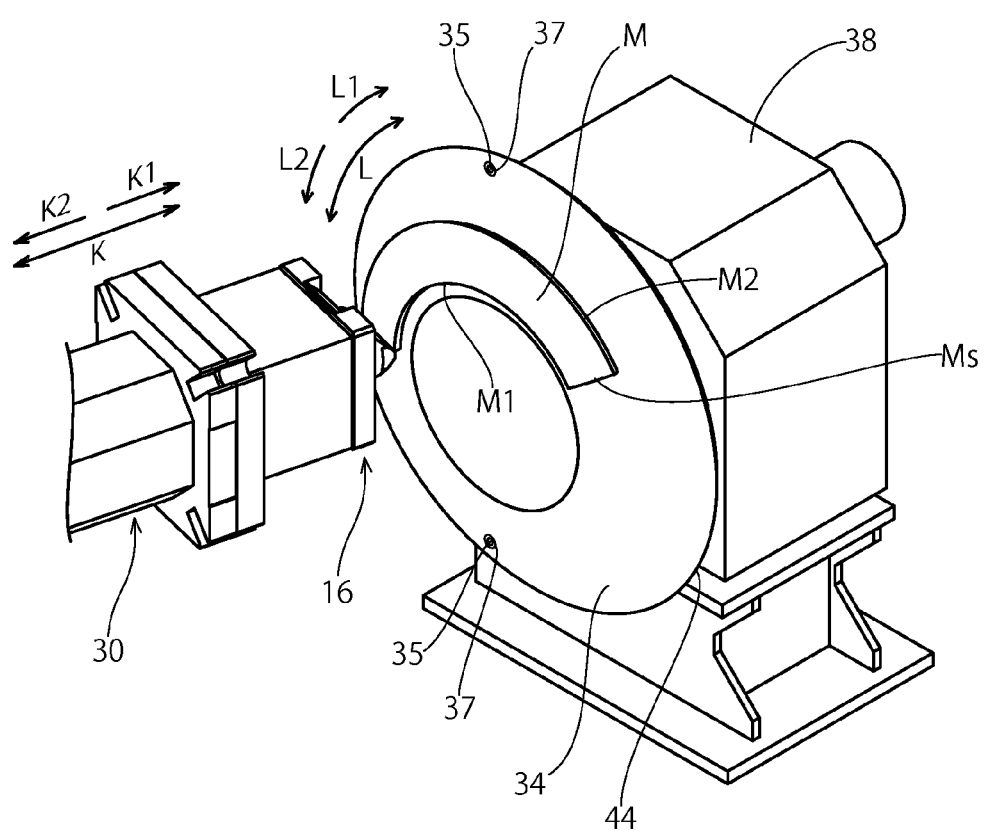
FIG. 6 is a perspective view illustrating a state where a rubber member is manufactured using the manufacturing apparatus of the rubber member in FIG. 1.

Next, after a predetermined time (for example, one second) elapses from the moment of starting the rotation of the support surface 34, the rubber material is discharged from the discharge port 32 to the rubber collection chamber 56, and while the support surface 34 is rotated and moved, the cylinder mechanism 64 of the shutter driver 60 is driven, the shutter 58 is moved from the closing position to the opening position, and the opening 53 of the rubber collection chamber 56 opens. As illustrated in FIG. 6, the support surface 34 is continuously rotated in a state of opening the opening 53, until the tip of the mouthpiece 16 reaches a position further rotated at a predetermined angle than a position (leading end position Ms of the rubber member M molded on the support surface 34) where the rotation on the support surface 34 starts, the support surface 34 is rotated, and the trailing end Me of the rubber member M is stacked on the leading end Ms. Accordingly, the rubber material is discharged from the opening 53 which is provided at the rubber collection chamber 56, and the annular rubber member M which has a cross-sectional shape corresponding to the shape of the opening 53 is molded on the support surface 34. When the support surface 34 is moved and rotated, the rubber material is continuously discharged into the rubber collection chamber 56 from the discharge port 32 by a predetermined feeding amount.

Then, if the tip of the mouthpiece 16 reaches the leading end position Ms of the rubber member M molded on the support surface 34, the rotation of the support surface 34 is stopped, the extruder 12 and the gear pump 14 are stopped and the discharge of the rubber material to the rubber collection chamber 56 is stopped. Thereafter, a base driver 50 is driven and the support surface 34 of the support member 18 is moved apart from the mouthpiece 16.

As described above, in the present embodiment, the rubber collection chamber 56 is formed between the mouthpiece 16 and the support surface 34, and the opening 53 which discharges the rubber material from the rubber collection chamber 56 can be opened and closed using the shutter 58. Therefore, after the rubber collection chamber 56 is filled up with the rubber material in a state where the shutter 58 closes the opening 53, while the support surface 34 and the mouthpiece 16 are relatively moved, the opening 53 can be open by moving the shutter 58.

In this manner, if the shutter 58 is operated and the rubber member M is molded on the support surface 34, the leading end Ms of the rubber member M is molded so as to gradually thicken toward the trailing end Me, that is, so as to become thinner toward the tip. In addition, the trailing end Me of the rubber member M to be molded on the support surface 34 is stacked on the thinly molded leading end Ms of the rubber member M. Thus, it is possible to mold while striking the rubber material due to the opening 53 of the rubber collection chamber 56. Accordingly, it is possible to strongly bond the leading end Ms and the trailing end Me of the rubber member M, and additionally it is possible to realize a uniform weight balance without a bonded portion becoming thicker compared to the other portion even when the leading end Ms and the trailing end Me of the rubber member M are stacked in the thickness direction.

In addition, in the embodiment, the discharge port 32 provided at the mouthpiece 16 is provided at a position opposing the support surface 34. Therefore, it is possible to cause the rubber material, discharged from the discharge port 32 into the rubber collection chamber 56, to collide with the support surface 34 and thereby it is possible to strongly adhere the rubber member M to the support surface 34.

In addition, in the manufacturing apparatus 10 of the embodiment, the gear pump 14 is connected to the tip of the extruder 12 in the extruding direction and thus the feeding amount of the rubber material supplied to the mouthpiece 16 can be precisely controlled. Consequently, it is possible to mold the rubber member M which has a uniform cross-sectional shape.

In addition, in the manufacturing apparatus 10 of the embodiment, the tapered surface 58a is formed at the shutter 58 which opens and closes the opening 53 provided at the rubber collection chamber 56, and as it comes closer to the support surface 34, the dimension along the movement direction L of the support surface 34 becomes smaller. Accordingly, friction with the rubber member M discharged from the opening 53 decreases, and thereby it is difficult for the rubber member M to peel off from the support surface 34 and curl up to the shutter 58 side. Therefore, it is possible to prevent a defective molding of the rubber member M.

Second Embodiment

Next, a second embodiment will be described.

Figure 7:
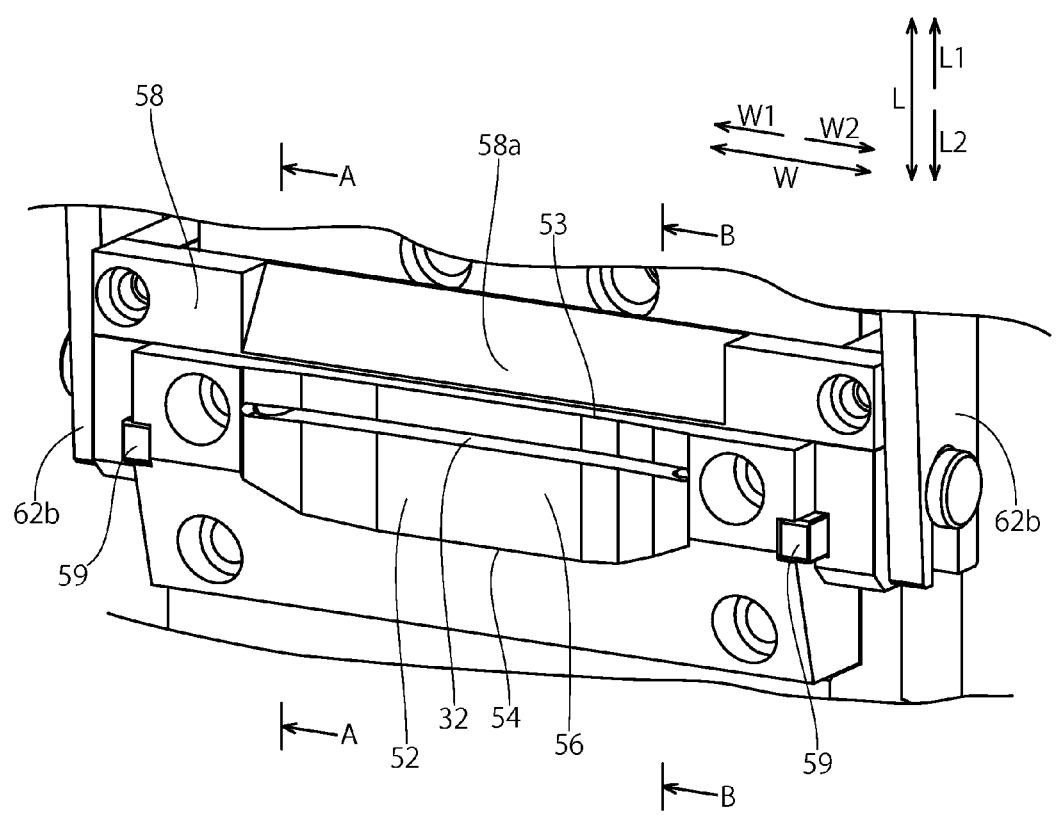
FIG. 7 is a perspective view illustrating an enlarged view of a mouthpiece in a manufacturing apparatus of a rubber member according to a second embodiment of the present invention.
Figure 8A:
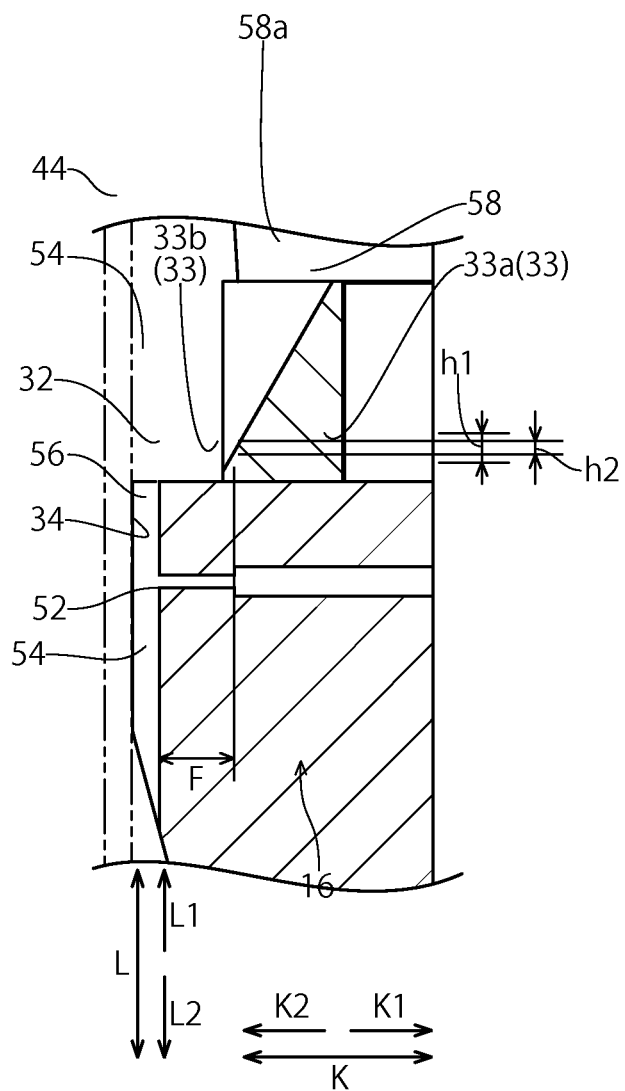
FIG. 8A is a cross-sectional view along the line A-A in FIG. 7.
Figure 8B:
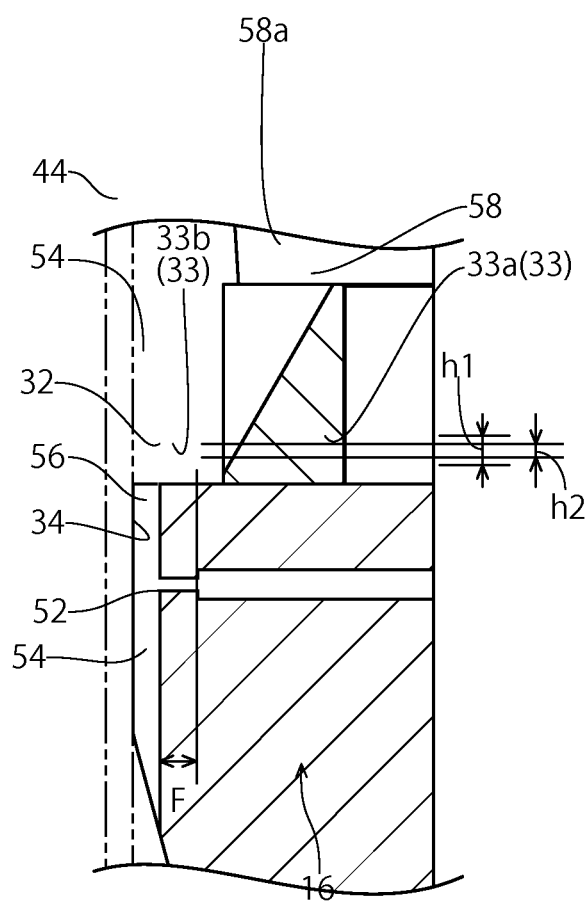
FIG. 8B is a cross-sectional view along the line B-B in FIG. 7.

In a manufacturing apparatus 10 of the present embodiment, as illustrated in FIGS. 7, 8A and 8B, a flow channel 33 in a mouthpiece 16, which guides a rubber material supplied from an extruder 12 to a discharge port 32 includes a first flow channel 33a provided at a gear pump 14 side and a second flow channel 33b provided in succession at the tip side (that is, the discharge port 32 side) of the first flow channel 33a.

The second flow channel 33b is configured such that the height (height along the direction perpendicular to a width direction W of the discharge port 32 and a feeding direction F of the rubber material) h2 of the discharge port 32 is shorter than a height h1 of the first flow channel 33a, and a cross-sectional area of the second flow channel 33b is smaller than a cross-sectional area of the first flow channel 33a. This second flow channel 33b is configured such that as it goes from one width direction W1 side of the discharge port 32 toward the other width direction W2 side, a length F along the feeding direction of the rubber material gradually becomes shorter. As a result, in the discharge port 32, flow rate (discharge amount) of the rubber material discharged from the one width direction W1 side becomes smaller than flow rate of the rubber material discharged from the other width direction W2 side.

In a case of manufacturing an annular thin plate shaped rubber member M illustrated in FIG. 11 using this manufacturing apparatus 10 of the present embodiment, in such a manner that one width direction W1 side of the discharge port 32 is located on an inner side M1 of the rubber member M and the other width direction W2 side of the discharge port 32 is located on an outer side M2 of the rubber member M, a support surface 34 and the mouthpiece 16 are relatively moved, and the rubber member M which has the annular thin plate shape is molded on the support surface 34. Consequently, the flow rate of the rubber material discharged from the discharge port 32 becomes smaller on the inner side M1 than on the outer side M2 of the rubber member M. Therefore, it is possible to mold the rubber member M without causing wrinkles on the outer side M2.

Furthermore, the other configuration is the same as that of the first embodiment and thus the same effect can be achieved.

Third Embodiment

Next, a third embodiment will be described.

In a manufacturing apparatus 10 of the present embodiment, a support surface 34 is formed from a base 42 configuring a support member 18, and a plate-like support device 44 which is attachable and detachable with respect to the base 42.

Figure 9:
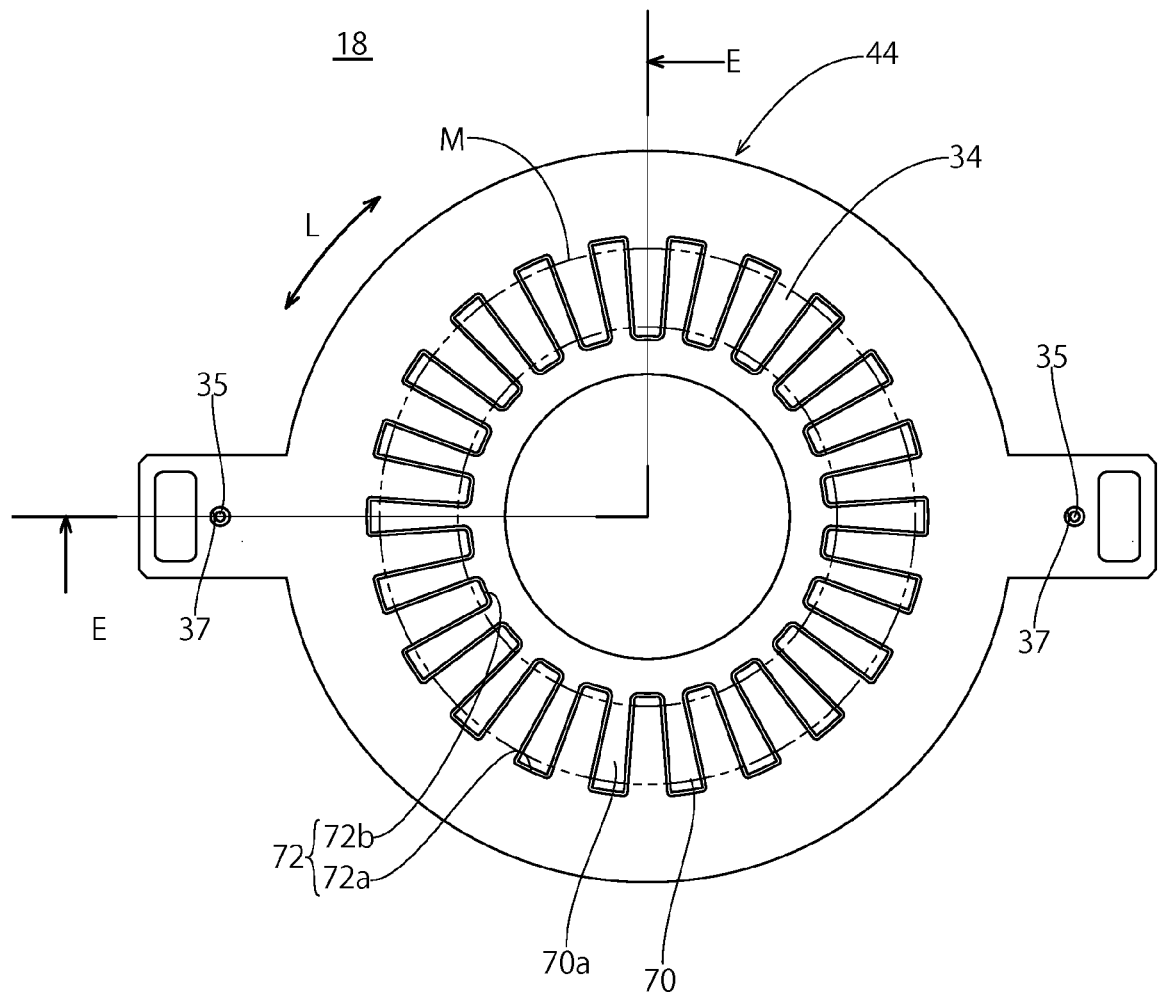
FIG. 9 is a front view of a support member in a manufacturing apparatus of a rubber member according to a third embodiment of the present invention.
Figure 10:
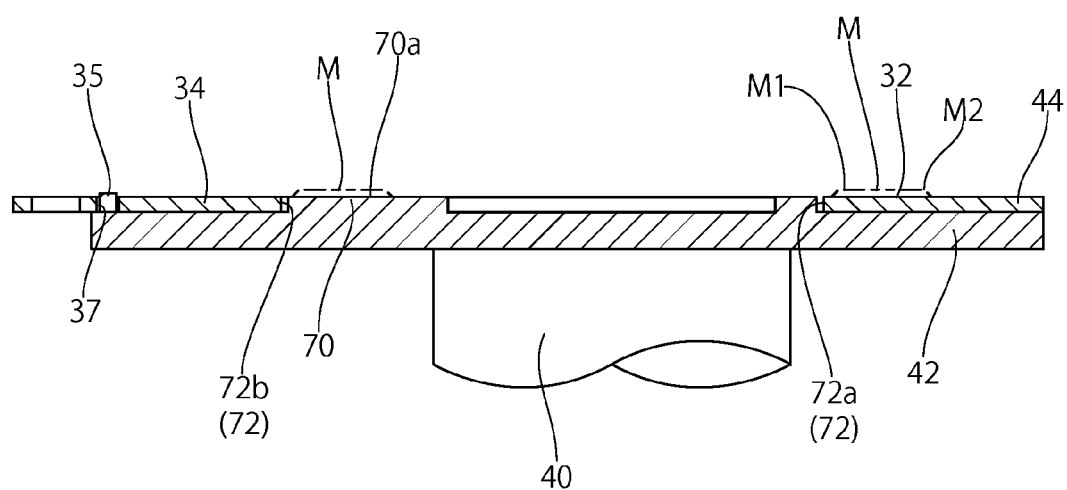
FIG. 10 is a cross-sectional view along the line E-E in FIG. 9.

In detail, as illustrated in FIGS. 9 and 10, the base 42 includes a protrusion 70 protruding toward the support device 44. The plate-like support device 44 has a through hole 72 which is drilled at a position corresponding to the protrusion 70 provided at the base 42. The protrusion 70 provided at the base 42 protrudes only in a dimension substantially equal to the thickness dimension of the plate-like support device 44.

In the embodiment, the through hole 72 drilled in the support device 44 is formed by a circular hole 72a which is circular in planar view, and a plurality of long holes 72b radially extending from the circular hole 72a. A plurality of the long holes 72b are provided at equal intervals in the circumferential direction. The protrusion 70 provided on the base 42 is provided at a position corresponding to the long holes 72b drilled in the support device 44, with a shape corresponding to the long holes 72b.

If this support device 44 is attached to the base 42 such that the center of the circular hole 72a matches with a pivot 40 of rotation driver 38, the protrusion 70 protruding from the base 42 is fitted into the long holes 72b provided at the support device 44. Then, an end surface 70a of the protrusion 70 and the support device 44 are alternately arranged in a movement direction L of the support surface 34, the flat support surface 34 is formed by the end surface 70a of the protrusion 70 and the support device 44.

Then, similarly to the first embodiment, a mouthpiece 16 provided at the tip of an extruder 12 is moved close to the support device 44. While the support surface 34 and the mouthpiece 16 are relatively moved, a rubber material kneaded by the extruder 12 is extruded from the mouthpiece 16. In this manner, a rubber member M which has an annular thin plate shape illustrated in FIG. 11 is molded on the support surface 34 formed by the end surface 70a of the protrusion 70 and the support device 44 which are provided at the base 42.

As described above, in the embodiment, the flat support surface 34 is formed by the end surface 70a of the protrusion 70 and the support device 44 which are provided on the base 42, and then the rubber member M is molded on the support surface 34. If the support device 44 is detached from the base 42 after the rubber member M is molded, the rubber member M is peeled off from the protrusion 70 of the base 42, is attached onto the support device 44 so as to straddle the long holes 72b of the support device 44, and the contact area with the support device 44 decreases. Accordingly, in a case where the rubber member M to be adhered to the support device 44 is replaced with a separate member such as a non-vulcanized tire intermediate body, the rubber member M is easily peeled off from the support device 44 and thereby a replacement work of the rubber member M becomes easy.

In addition, when molding the rubber member M, the protrusion 70 is fitted into the long holes 72b of the support device 44, the flat support surface 34 is formed by the support device 44 and the end surface 70a of the protrusion 70, and thereby the contact area between the rubber member M and the support surface 34 rarely decreases. Accordingly, it is hard for the rubber member M to be carelessly peeled off during the molding and thereby a defective molding can be prevented.

In addition, in the embodiment, the end surface 70a of the protrusion 70 and the support device 44 are alternately arranged in the movement direction L of the support surface 34. Therefore, a force which peels off the rubber member M from the protrusion 70 of the base 42, generated when the support device 44 is detached from the base 42, does not locally act on the rubber member M and thereby the rubber member M is not easily damaged when the support device 44 is detached from the base 42.

What is claimed is:
1. A manufacturing apparatus of a rubber member, comprising:
   an extruder that kneads and feeds a rubber material;
   a mouthpiece that discharges the rubber material supplied from the extruder;
   a support member that has a support surface opposing the mouthpiece;
   a rubber collection chamber that is formed between the mouthpiece and the support surface, that collects the rubber material discharged from the mouthpiece, and that has an opening in a front movement direction of the support surface with respect to the mouthpiece and an opening in a rear movement direction of the support surface; and
   a shutter that opens and closes the opening in the front movement direction of the support surface with respect to the mouthpiece,
   wherein a plate-like rubber member is molded using the rubber material discharged from the mouthpiece onto the support surface by relatively moving the support surface and the mouthpiece.

2. The manufacturing apparatus of a rubber member according to claim 1,
wherein the mouthpiece includes a discharge port that discharges the rubber material to the rubber collection chamber, and the discharge port opposes the support surface.

3. The manufacturing apparatus of a rubber member according to claim 1,
wherein the mouthpiece includes a discharge port that discharges the rubber material to the rubber collection chamber, and a flow channel that guides the rubber material supplied from the extruder, to the discharge port,
wherein the flow channel includes a first flow channel and a second flow channel that is provided in succession at the tip side of the first flow channel, and that has a smaller cross-section area than the first flow channel, and
wherein in the second flow channel, one side in the width direction is longer than the other side in the width direction.

4. The manufacturing apparatus of a rubber member according to claim 1,
wherein a gear pump is provided between the extruder and the mouthpiece.

5. The manufacturing apparatus of a rubber member according to claim 1,
wherein the support member includes a base that has a protrusion, and a support device that is attachable and detachable with respect to the base, and
wherein in a state where the support device having a through hole is attached to the base, the protrusion is fitted into the through hole, and the support device and the protrusion form the support surface.

6. The manufacturing apparatus of a rubber member according to claim 5,
wherein the protrusion and the support device are alternately arranged in the movement direction of the support surface with respect to the mouthpiece.

7. The manufacturing apparatus of a rubber member according to claim 1,
wherein the shutter includes a tapered surface that is inclined in the direction apart from the support surface as it goes in the front movement direction of the support surface with respect to the mouthpiece.

* * * * *